United States Patent [19]

Frey et al.

[11] 4,365,682
[45] Dec. 28, 1982

[54] SUSPENSION SYSTEM FOR OPERATOR COMPARTMENT

[75] Inventors: G. Robert Frey, Franklin; Joseph A. Rogus, Snow Shoe; Paul R. Johnson, Reno; Richard A. King, Emlenton, all of Pa.

[73] Assignee: Joy Manufacturing Company, Pittsburgh, Pa.

[21] Appl. No.: 219,648

[22] Filed: Dec. 24, 1980

[51] Int. Cl.³ .............................................. B62D 33/06
[52] U.S. Cl. .................................. 180/89.13; 296/190
[58] Field of Search ................... 180/89.13, 89.14, 326, 180/327; 296/190

[56] References Cited

U.S. PATENT DOCUMENTS

| | | | |
|---|---|---|---|
| 3,675,966 | 7/1972 | Luft | 296/190 |
| 3,885,643 | 5/1975 | Goodbary | 180/89.13 |
| 4,022,026 | 5/1977 | Childress | 61/63 |
| 4,065,167 | 12/1977 | Wright | 296/190 |
| 4,078,629 | 3/1978 | Kutay et al. | 180/89.13 |
| 4,079,792 | 3/1978 | Paul et al. | 173/34 |
| 4,146,106 | 3/1979 | Childress | 180/326 |

Primary Examiner—Robert R. Song
Attorney, Agent, or Firm—Raymond W. Augustin

[57] ABSTRACT

A suspension system for the operator compartment of a mine vehicle suitable for working in underground mines having low head room. A pair of vertically extending guide tracks are rigidly secured to a frame member of the mine vehicle. Each of the track members has associated with it a roller bracket constructed so that all moving contact between the roller bracket and the guide track which guides it is a rolling contact. Each roller bracket includes a projecting stud member of substantial construction which passes through an opening in the rear wall of the operator compartment, the two stud members providing the only points of support for the operator compartment. The operator compartment normally rests on and slides over the floor of the mine and by this arrangement is free to move vertically up and down as the elevation of the mine floor changes or when the bottom of the operator compartment encounters obstacles or debris on the mine floor. One of the openings in the rear wall of the operator compartment is elongated to permit either end of the compartment to move in an arcuate path with respect to the other end so that the compartment may tilt from end to end as required and to prevent binding and sticking of the roller brackets as they move vertically on the guide tracks. Stop means and shock absorbing means are provided to limit movement of the roller brackets in the guide tracks and to cushion the shock transmitted to the operator when the roller brackets impact the stop means.

10 Claims, 8 Drawing Figures

SUSPENSION SYSTEM FOR OPERATOR COMPARTMENT

BACKGROUND OF THE INVENTION

This invention relates to but is not limited, to a suspension system for an operator compartment for a mine vehicle such as a shuttle car.

Mining vehicles for use in underground mines are commonly equipped with operator compartments consisting of a platform provided with an overhead shield or canopy to protect the operator and a seat for the operator. Since such vehicles must often work in very limited head room, the operator compartments are generally located to the side of the vehicle. Suitable controls for the machine are provided within reach of the operator. To make the most use of the head room available, limited ground clearance is provided below the operator platform. In many cases zero ground clearance is provided; that is, the operator platform is allowed by various arrangements to rest on the floor of the mine and is dragged along following the contour of the mine floor as the vehicle moves through the mine. Since the mine floor is likely to have undulations and sharp depressions as well as obstacles and debris of various kinds, it is necessary to provide means which will permit the operator compartment to smoothly and easily follow the changes in elevation of the mine floor as the operator platform slides over it. One known means is to pivot the operator platform at one end to the frame of the mine vehicle leaving the other end unattached and able to swing up and down about the pivoted end. Another is to have the operator compartment slidable on rails. Both have severe limitations. In the pivoted type, the pivoted end is fixed vertically and the compartment does not have the desired flexibility of movement. In the slidable type the slides and rails tend to bind and stick in the environment of a mine.

SUMMARY OF THE INVENTION

The present invention is directed to new and novel means for supporting the operator compartment of a mine vehicle, permitting it to rest on the mine floor and allowing either end of the platform to rise and fall as the mine floor elevation changes and to ride over obstacles or debris on the floor of the mine. This is done by suspending the operator compartment from guide tracks rigidly secured to the main frame of the machine and by a unique arrangement of guide rollers and brackets maintaining secure rolling attachment of the operator compartment to the vehicle frame while freely permitting vertical motion between the operator compartment and the vehicle and permitting either end of the operator compartment to rise above or fall below the level of the other end. Means are also provided to limit the vertical motion of the compartment and to cushion the impact produced when the operator compartment reaches the limits of its permitted vertical movement as the result of a sharp change in elevation of the mine floor. The use of rollers provides a definite improvement over systems which employ slidable rails and guides to permit vertical movement of the operator compartment. Smoother movement, free of sticking and binding present in sliding rail and guide systems, is obtained when the roller and track system of this invention is used.

It is an object of this invention to provide an operator compartment suspension system which permits smooth and easy vertical movement of the operator compartment with respect to the mine vehicle on which it is mounted.

It is also an object of this invention to provide such a suspension system in which all contact between moving parts is normally a rolling contact.

Another object of this invention is to provide a suspension system for the operator compartment of a mine vehicle having shock absorbing means interposed between the moving parts of the suspension system for greater comfort of the operator when the moving parts of the suspension reach their limits of travel abruptly.

Another object of this invention is to provide a simple rugged suspension system for an operator compartment of a mine vehicle which permits smooth and easy vertical movement of the operator compartment with respect to the mine vehicle and of one end of the operator compartment with respect to the other.

These and other objects and advantages of this invention will become apparent and will become more fully understood from the following description and accompanying drawings. For purposes of description, the invention is described in reference to an operator compartment for a mine shuttle car which is mounted on rubber tires and can be propelled in either the forward or reverse direction and is illustrated as applied to an operator compartment having dual seating and dual controls. It is to be understood that the invention is not limited to such vehicles or seating control arrangements and may be used with other types of vehicles and controls and seating arrangements.

DESCRIPTION OF THE INVENTION

Figure 1:
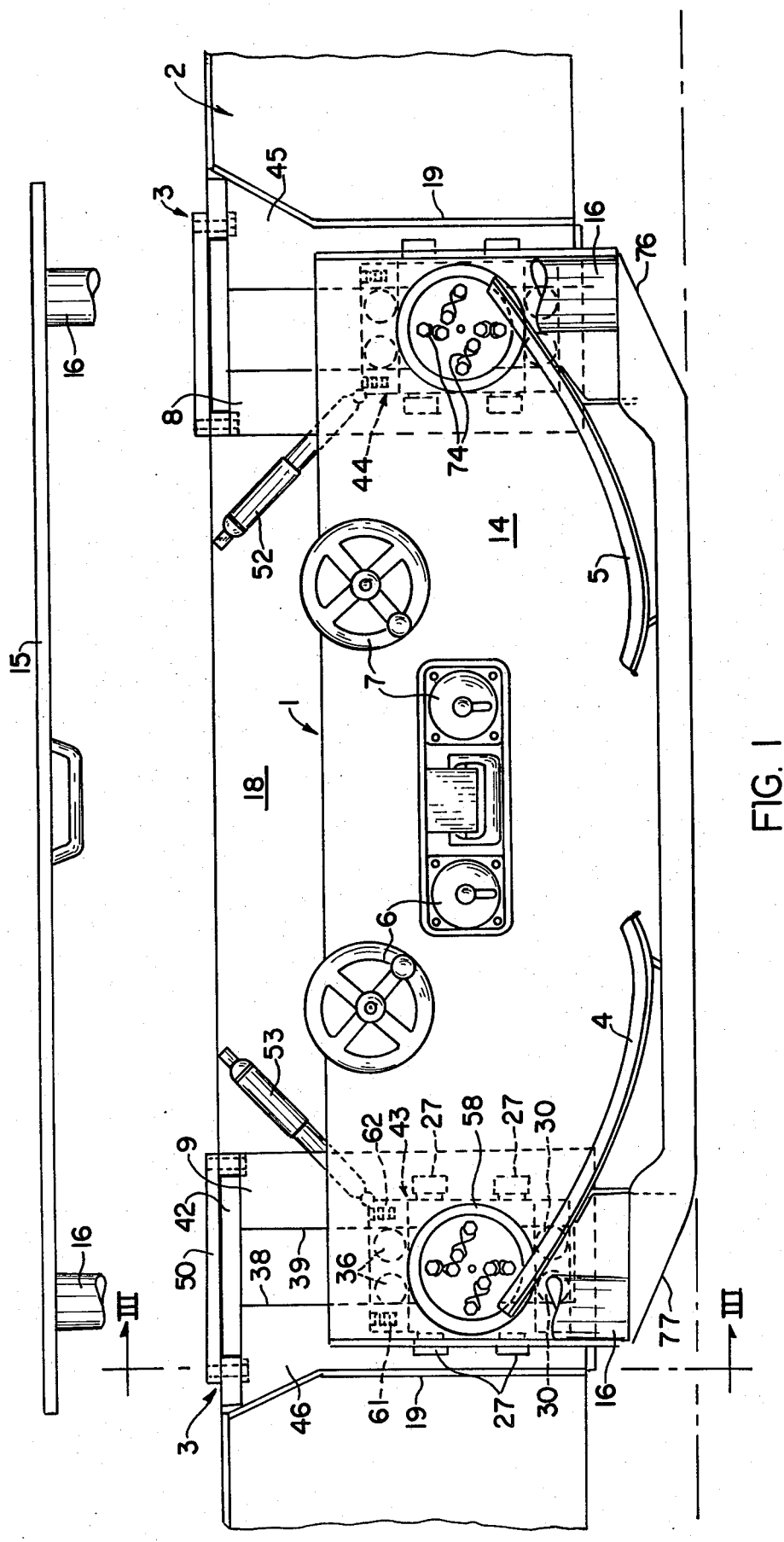
FIG. 1 is a schematic representation of an operator compartment incorporating the suspension system of the invention. Parts of the supports for the protective canopy are broken away for clarity.

Referring now to the drawings there is shown an operator compartment 1 mounted on a mine vehicle 2 by a suspension system 3. The invention is illustrated in conjunction with a vehicle such as a shuttle car designed for propulsion in both a fore and aft direction and is shown with dual seats 4 and 5 and dual sets of controls 6 and 7. The suspension system includes a pair of guide tracks 8 and 9 on which the operator compartment is supported by a pair of roller brackets or dolly assemblies 43 and 44. The roller brackets are mounted on the tracks and secured to the rear wall of the operator compartment in such a manner that the operator compartment may readily move in a vertical direction and either end of the operator's compartment may be allowed to tilt vertically up or down with respect to the other end as will be hereinafter explained.

As may be seen in FIGS. 5, 6, 7 and 8 the vertical position of the operator compartment will automatically adjust to suit various conditions of the mine floor or to ride over obstacles or debris which may have been left on the mine floor. It is also possible to limit downward motion of the operator compartment or to lock the compartment in its highest vertical position. Shock absorbing means may also be provided to reduce the shock to the occupant of the operator compartment when conditions on the mine floor produce a large and rapid change in elevation of the operator compartment and cause the roller guides to impact one of the stops provided to limit vertical travel of the compartment.

The operator compartment is of a construction well known in the art and comprises a bottom platform 13, a rear wall 14 and a canopy 15. As is well known in the art the canopy may be secured to the platform by telescoping columns 16 which may be locked in various positions of adjustment by locking pins (not shown).

Figures 3, 4:
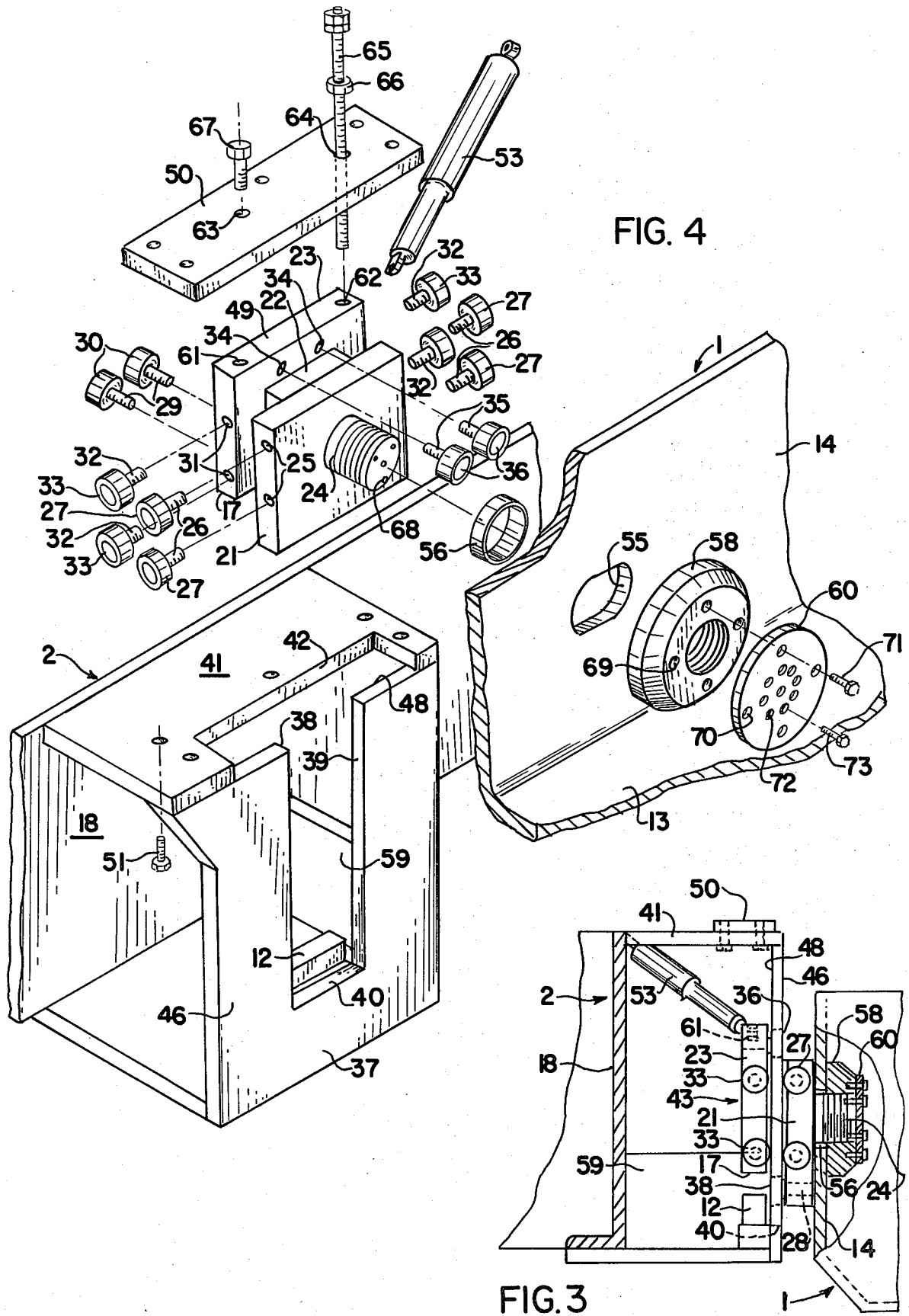
FIG. 3 is a section of one end of the suspension system taken along the lines III—III in FIG. 1 and with parts broken away for clarity.
FIG. 4 is an exploded view of one end of the suspension system showing details of some of the parts and also illustrating an optional locking system for holding the operator's compartment in elevated position.

As may be seen in FIG. 4, each of the guide tracks is generally of U-shaped configuration with the free ends suitably rigidly attached as by welding to a frame member 18 of the mine vehicle and further secured and attached as by welding to the vehicle fender 19 and by a reinforcing members or ribs 59 suitably secured to the guide track and to the main frame member as by welding. The vehicle fender is shown partially broken away to more clearly show some of the details of the invention. The roller brackets or dollies 43 and 44 are substantially identical and one of them will be described in connection with FIG. 4. Each dolly assembly 43, 44 consists of three blocks, 21, 22, and 23 of heavy metal joined together by a suitable means such as welding. Each of the blocks 21 has rigidly secured to it a stud of substantial cross section for supporting one end of the operator's compartment as hereinafter described. Stud 24 is provided on dolly 43 and stud 20 is on dolly 44. Block 21 also has four tapped holes 25 which receive the studs 26 of rollers 27. Another pair of tapped holes 28 are provided in the rear face of block 21 and receive the studs 29 of rollers 30. In like manner block 23 is provided with four tapped holes 31 around its periphery to receive the studs 32 of rollers 33 and on its front face with tapped holes 34 which receive the studs 35 of a pair of rollers 36. Rollers 27, 30, 33 and 36 may be of any well known type and may be provided with ball or roller bearings or the like to reduce friction. Set screws or other means (not shown) may be used to lock the studs and rollers in place in the dolly assemblies. Although the rollers are described as being of a type provided with threaded studs and attached to the blocks by means of threaded holes, it is understood that any available and suitable rollers and forms of attachment may be used. As can be seen in FIG. 4 the front plate or bight portion 37 of each of the guide tracks is provided with an elongated opening or slot surrounded by surfaces 38, 39, and 40 and the top plate 41 is provided with an opening 42. Alternatively, the bight portion of the track member may be made as two separate pieces (not shown) spaced apart to form a slot between them. The opening or slot in the front plate 37 is large enough to readily receive and allow movement of block 22 therein and the opening 42 is large enough to receive block 23 with clearance on all sides. Plates 37 and 41, blocks 21, 22 and 23 and rollers 27, 30, 33 and 36 are all constructed and arranged so that the only contact between the parts of the dolly assemblies 43 and 44 and the guide tracks 8 and 9 is between the various rollers and the cooperating surfaces of the guide tracks. Specifically, the rollers 27 will contact the front surface 45 and 46 of tracks 8 and 9, the rollers 33 will contact the rear surfaces 47 and 48 of tracks 8 and 9 and the rollers 30 and 36 will contact the surfaces 38 and 39 of each of the track sections. Rollers 27 and 33 form opposed sets of rollers which guide and support the dollies 43, 44 on the guide tracks 8 and 9 and one of the rollers 30 and one of the rollers 36 which contact the surface 38 form an opposed set of rollers with the other of the rollers 30 and 36 which contact the surface 39 to further help guide and support the dollies. This arrangement together with the elongated opening 55 allows the dollies to move up and down freely and easily without sticking or binding even though the operator compartment is in a tilted or inclined position. A limit block 12 is attached to the inside of each of the track sections and will be contacted by the bottom surface 17 of block 23 to provide a bottom limit to the travel of the dollies and the upper limit of travel is established by the abutment of top surface 49 of block 23 with cover plate 50 which is fastened to top plate 41 by a plurality of suitable screws or bolts 51. Limit block 12 may be provided with a top portion of rubber or other suitable material to help cushion the impact between the dolly and block 12. Block 12 is proportioned and arranged so that it will stop the motion of the dolly before rollers 30 reach the bottom 40 of the slot in front plate 37.

It can be seen that with the operator compartment supported by the studs on the two dolly assemblies the compartment will be firmly supported on the track members, but will be free to move in a vertical direction within the limits of the opening in the track section.

As the mine vehicle travels over the mine floor with the bottom of the platform 13 resting on the surface of the mine floor the suspension system will allow the operator compartment to rise or fall as required. The bottom platform 13 of operator compartment 1 is inclined at both its ends as shown in 76, 77 to facilitate movement of the operator compartment over the mine floor and climbing over objects which may be encountered. In the event of a sharp change in mine floor elevation or if the bottom platform of the operator compartment suddenly clears or encounters an obstacle on the mine floor, such as a timber, the compartment would suddenly rise or drop and one or both of the dollies might contact cover plates 50 or limit block 12 of the track opening and a relatively severe jolt or shock would be transmitted to the operator in the compartment. To minimize this reaction cylinder type fluid shock absorbers 52, 53 are suitably mounted between each of the dollies and its corresponding track section to control the rate of change of movement and cushion the impact. Rubber or other impact absorbing cushions (not shown) may be employed in place of or in addition to the shock absorbers.

To hang the operator compartment from the dollies, holes 54, 55 are provided in the rear wall of the operator compartment so that they register with and pass over the studs 24 and 20 of the dolly assemblies. Bushings 56, 57 may be provided between the threads of the studs and the edges of the openings in the operator compartment. One of the holes in the wall of the operator compartment is cylindrical and fits around its associated stud with a minimum of clearance. Appropriate adjustment in the hole size is made, of course, if a bushing is used. The other opening in the rear wall, which as shown in FIG. 4 would be the opening 55, is elongated to permit the operator compartment to swing in an arcuate path or tilt in the event one end or the other is on higher ground or in the event that one end of the operator compartment encounters an obstacle or debris such as a timer as the mine vehicle traverses the mine floor. In a typical suspension system the operator compartment may have a total vertical travel of a foot or less and only about an inch of elongation of the hole 55 is required to freely permit the compartment to tilt. Sufficient elongation of the aperture 55 should be provided to permit one end of the compartment to be located so that its associated dolly is resting on its bottom stop while the other end is located so that its associated dolly is abutting the cover plate. It is not material which of the openings in the wall of the operator compartment is elongated as long as sufficient elongation is provided to permit the operator compartment to tilt as described. Although it is preferred to elongate only one of the openings 54 or 55, both of them could be elongated.

To complete attachment of the operator compartment to the dollies, attaching plates 58, having bores internally threaded to match the thread on the studs 24, 20 are threaded onto the studs after the studs are inserted into the apertures 54 and 55. The plates 58 are tightened on the threads to a position where the operator compartment is firmly supported on the dollies 43, 44 but sufficient clearance remains between the block 21, the wall 14 of the operator compartment and the plate 58 to permit the compartment to rotate about the studs 24, 20 as required to allow one end or the other of the compartment to tilt as described. Wrench flats, or spanner holes or other suitable wrenching means (not shown) are provided on the plates 58 to permit rotation of the plates by a suitable spanner or wrench. To prevent inadvertent movement of the plates 58, they are locked in position after being adjusted to the desired degree of tightness. To lock the plates 58, a lock plate 60 is bolted to the studs and to the plates 58. Tapped holes 68 are provided in the studs and tapped holes 69 are provided in the plates 58. The lock plates are sized to encompass the area in which holes 69 are located and have openings 70 which are in registry with the holes 69 when lock plate 60 is placed on plate 58. Openings 70 are of sufficient size to permit bolts 71 to pass freely therethrough and attach the locking plate to plate 58. Lock plate 60 is also provided with index apertures 72 arranged so that various ones will come in registry with the tapped holes 68 as the plates 58 are rotated on their associated studs 20, 24. Bolts 73 are inserted through the index apertures which are in registry with the tapped holes 68 when the plates 58 have been turned to the desired tightness as described above. Some or all of the bolts 71 and 73 may be secured with locking wires 74 as indicated in FIG. 1 in a well known manner. When there is sufficient overhead clearance in the mine that it is not necessary to have the operator compartment rest on the mine floor or for other reasons it may be desirable to maintain the operator compartment in its uppermost position of adjustment or in any position between the uppermost and lowermost limits of travel or to limit the downward motion of the compartment above the level where the block 23 contacts the limit block 12. To afford this possibility, two tapped bores 61 and 62 are provided in the top of each of the blocks 23 and apertures 63 and 64 are provided in the cover plates 50 in registry with the bores 61 and 62. To raise either or both ends of the operator compartment or to limit its downward movement, a threaded rod 65 is passed through one of the apertures 63 or 64, which are large enough to permit the rod to pass freely therethrough, and threaded into the corresponding one of the tapped bores 61 or 62 in the top of block 23 in one or both of the dollies as needed. A nut 66 is provided on the threaded rod and may be adjusted until the operator compartment is brought into the desired position. If it is desired to lock the operator compartment in its uppermost position, a bolt 67 of the appropriate length is threaded into the other of the bores 61 or 62 and tightened to lock the operator compartment in its uppermost position.

FIGS. 5 through 8 respectively illustrate how the operator compartment is permitted to shift positions as it encounters changes in mine floor elevation or obstacles or debris on the mine floor.

Figure 2:
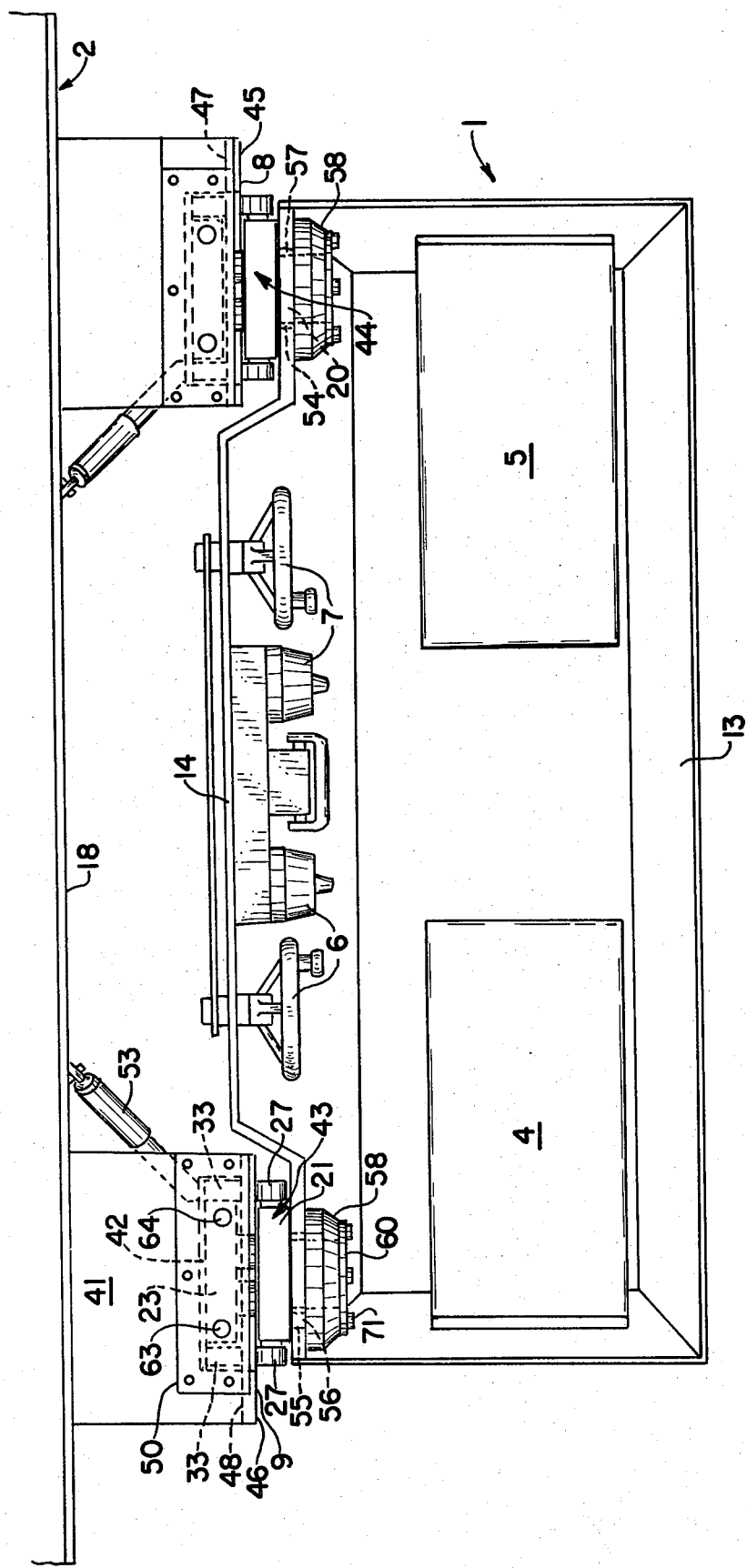
FIG. 2 is a top plan view of the operator compartment and suspension system shown in FIG. 1, but with the canopy and supporting parts removed for clarity.
Figure 5:
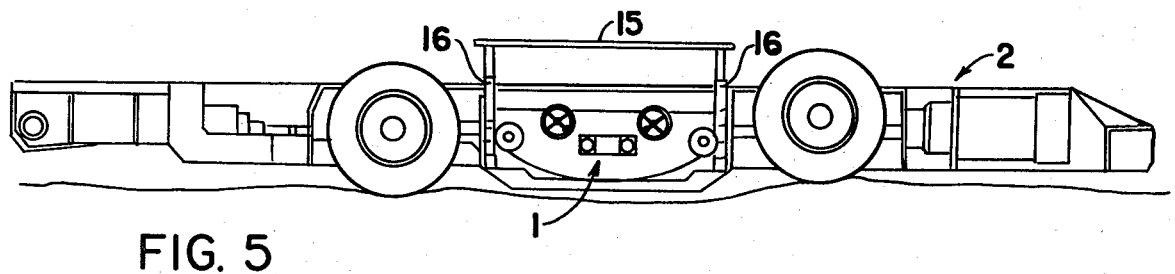
FIGS. 5 through 8 are schematic views showing the operator compartment in various positions of vertical adjustment with respect to the vehicle on which it is mounted and in various attitudes of inclination with respect to the horizontal, all as permitted by the suspension system of the invention.
Figure 6:
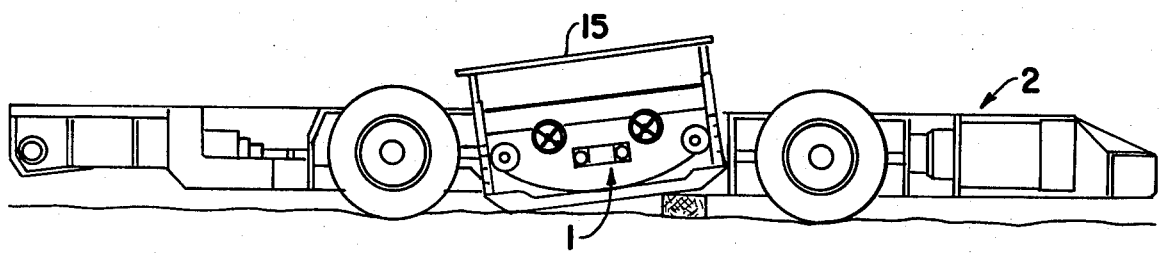
Figure 7:
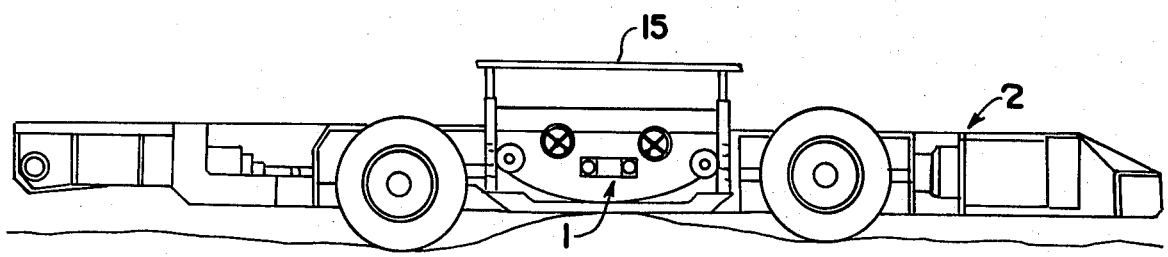
Figure 8:
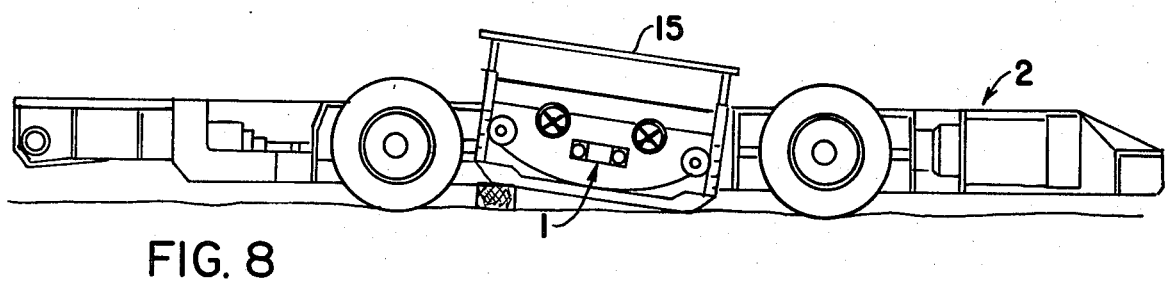

FIG. 5 illustrates the position of the operator compartment when it is over a depression in the mine floor with the wheels of the vehicle on relatively higher ground. In this position the dollies at each end of the compartment have reached their bottom stop position and the compartment is suspended slightly above the mine floor. FIG. 6 shows the right hand end of the operator compartment in a raised position to clear a timber which is on the floor of the mine while the left hand end of the compartment remains touching the floor of the mine. FIG. 8 shows the position of the compartment as it is about to descend from a timber which it has passed over in traveling from left to right in the drawings. This would also be the attitude of the compartment as it began to climb over a timber on the floor of the mine while the vehicle is traveling from right to left as viewed in the drawing. FIG. 7 shows the position of the operator compartment when it is substantially centered over a small mound on the floor of the mine. As the vehicle moves from left to right and the operator compartment encounters an obstacle such as a mine timber as shown in FIG. 6, the right hand end of the compartment will be forced upward causing the dolly 44 to roll upward on track 8. The left hand end of the operator compartment will remain resting on the ground. In effect the operator compartment will pivot about stud 24 of dolly 43 and opening 54 in the rear wall of the compartment will travel in a generally arcuate path while the stud 20 of the dolly 44 travels in a linear path determined by track 8. To compensate stud 24 of dolly 43 will move outward (to the left as shown in FIGS. 2 and 4) in opening 55, which is elongated, as previously described. As the operator compartment continues to slide over the timber toward the right, the left hand end of the compartment will begin to rise and its right hand end will lower until, when the timber is substantially at about the mid-point of the compartment, the compartment will again assume a level position but elevated to clear the timber. As the operator compartment pivots from the position shown in FIG. 6 to a level attitude, the linear distance between the axes of the stud 24 of dolly 43 and stud 20 of dolly 44 will become shorter and stud 24 will slide within elongated opening 55 to compensate. As the vehicle moves further to the right, the right hand end of the operator compartment will begin to lower and the left hand end will rise in arcuate paths with respect to each other until the right hand end of the compartment contacts the mine floor or the dolly 44 contacts its associated limit block 12. The distance between the axes of studs 24 and 20 will again increase and stud 24 will move outward in opening 55.

Finally the left hand end of the operator compartment will clear the timber and drop to the ground or to the point at which dolly 43 will strike its limit block. If the compartment is allowed to free-fall there will be a sharp jolt as it comes to a stop. However, shock absorber 53 will control the rate of fall of dolly 43 and the operator compartment and cushion the impact. The operator compartment would also be in the position shown in FIG. 7 when it has traversed the timber shown in FIGS. 6 and 8 so that the obstacle is located substantially under the midpoint of the compartment.

It can be seen from the above description that this invention has provided a novel apparatus for supporting an operator compartment on a mine vehicle for use in underground mines having limited head room which permits the operator compartment to smoothly and easily change elevation in either a linear or arcuate path or both to compensate for unevenness in the mine floor or to ride over debris or other obstacles on the mine floor on which it is resting as the vehicle travels through the mine.

Although the preferred embodiment of the invention has been shown and described, it will be evident that numerous changes and variations can be made in the details thereof without departing from the invention as defined and claimed in the appended claims.

What we claim is:

1. A suspension system for the operator compartment of a mine vehicle having a frame, said system comprising track members arranged in a substantially vertical plane and rigidly secured to the frame of the vehicle, first means for supporting the operator compartment on said track members, said first means permitting vertical movement of each end of said operator compartment in a linear path along said track members, second means for limiting such vertical movement and third means cooperating with said first means to permit vertical movement of one end of said compartment with respect to the other in an arcuate path.

2. A suspension system as claimed in claim 1 in which moving contact between the track members and other parts of the suspension system is a rolling contact.

3. A suspension system as defined in claim 1 in which the operator compartment is attached to the suspension system at two points only.

4. A suspension system as defined in claim 1 in which said second means has stationary and movable parts and the system includes means to cushion the impact between said movable and stationary parts when the operator compartment reaches the limits of travel permited by said second means.

5. A suspension system as defined in claim 1 having additional means to selectively adjustably limit or prevent vertical movement of the operator compartment.

6. A suspension system for the operator compartment of a mine vehicle which vehicle is adapted for longitudinal motion in two directions and said operator compartment is of the type adapted to slide over the mine floor in contact with it, said suspension system comprising:
a pair of track members extending in a substantially vertical plane,
a pair of roller brackets in rolling contact with said track members and guided by said track members to move in a linear vertical path along said track members and means for securing the operator compartment to said roller brackets, said means being adapted to permit either end of said operator compartment to move in an arcuate vertical path with respect to the other end of said compartment.

7. A suspension system as claimed in claim 6 in which each of said track members has vertically extending parallel front and back surfaces and is provided with an elongated vertically extending slot having vertically extending opposed surfaces and each of said roller brackets is provided with opposed sets of rollers, one opposed set of rollers contacting the opposed surfaces of said slot and another opposed set of rollers contacting the front and back surfaces of the track member.

8. A suspension system as claimed in claim 6 including means to limit the vertical movement of said roller brackets.

9. A suspension system as defined in claim 8 in which each of said roller brackets is capable of travelling different distances along said track members with respect to one another within its limit of travel.

10. A suspension system as defined in claim 8 including additional means selectively operable to lock the operator compartment against vertical movement or to further limit vertical movement in the downward direction.

* * * * *